(12) United States Patent
Kim et al.

(10) Patent No.: US 11,203,384 B2
(45) Date of Patent: Dec. 21, 2021

(54) SPARE TIRE MOUNTING STRUCTURE

(71) Applicants: HYUNDAI MOTOR COMPANY, Seoul (KR); KIA MOTORS CORPORATION, Seoul (KR)

(72) Inventors: Eon Pyo Kim, Seoul (KR); Jang Ho Seo, Daejeon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 113 days.

(21) Appl. No.: 16/598,526

(22) Filed: Oct. 10, 2019

(65) Prior Publication Data

US 2020/0298918 A1 Sep. 24, 2020

(30) Foreign Application Priority Data

Mar. 20, 2019 (KR) ........................ 10-2019-0032025

(51) Int. Cl.
 *B62D 43/10* (2006.01)
 *B62D 25/08* (2006.01)

(52) U.S. Cl.
 CPC ........... *B62D 43/10* (2013.01); *B62D 25/087* (2013.01)

(58) Field of Classification Search
 CPC .... B62D 43/10; B62D 25/087; B62D 21/152; B62D 25/2027; B62D 43/02; B62D 43/04; B62D 43/002; B62D 43/08; B62D 25/20; B62D 21/15
 USPC ........... 296/37.2, 187.11, 37.11, 37.3, 65.16, 296/65.09, 50, 64, 187.08; 224/42.12, 224/42.13, 630, 553, 518, 42.25, 281, 224/42.11, 403
 See application file for complete search history.

(56) References Cited

U.S. PATENT DOCUMENTS

| | | | | |
|---|---|---|---|---|
| 2,647,012 A | * | 7/1953 | Walker | B62D 43/06 296/37.2 |
| 4,384,815 A | * | 5/1983 | Suzuki | B62D 43/04 224/42.23 |
| 8,469,430 B2 | * | 6/2013 | Urano | B62D 43/08 296/37.2 |
| 8,579,167 B2 | * | 11/2013 | Yamada | B62D 43/04 224/42.23 |
| 8,696,045 B2 | * | 4/2014 | Takenaka | B62D 43/10 296/37.2 |
| 9,821,729 B2 | * | 11/2017 | Zhou | B60R 11/06 |
| 2011/0133504 A1 | * | 6/2011 | Takenaka | B60R 11/06 296/37.2 |
| 2013/0049394 A1 | * | 2/2013 | Urano | B62D 43/08 296/37.2 |
| 2015/0014610 A1 | * | 1/2015 | Xu | B60R 11/06 254/126 |
| 2015/0336516 A1 | * | 11/2015 | Hibino | B60R 11/06 296/37.2 |

(Continued)

*Primary Examiner* — D Glenn Dayoan
*Assistant Examiner* — Sunsurraye Westbrook
(74) *Attorney, Agent, or Firm* — Morgan, Lewis & Bockius LLP (57) ABSTRACT

A spare tire mounting structure includes: a well portion in a rear floor panel of a vehicle body; a jack device which is detachably mounted within the well portion, and is raised or lowered within the well portion; a plurality of support bars mounted across the well portion; and a mounting bracket coupled to the plurality of support bars, wherein a spare tire is detachably mounted on the mounting bracket by a clamp, and is supported by the jack device.

9 Claims, 10 Drawing Sheets

(56) References Cited

U.S. PATENT DOCUMENTS

2016/0090046 A1\* 3/2016 Engerman ............... B60R 11/06
                                                             296/37.2

\* cited by examiner

SPARE TIRE MOUNTING STRUCTURE

CROSS-REFERENCE TO RELATED APPLICATION

The present application is based on and claims the benefit of priority to Korean Patent Application No. 10-2019-0032025, filed on Mar. 20, 2019 in the Korean Intellectual Property Office, the entire disclosure of which is incorporated herein by reference.

TECHNICAL FIELD

The present disclosure relates to a spare tire mounting structure, and more particularly, to a spare tire mounting structure which allows a spare tire to be mounted between a luggage board and a base surface of a rear floor panel.

BACKGROUND

In general, a spare tire for emergency use is mounted in a vehicle to replace a flat tire. The vehicle has a spare tire well on its rear side where the spare tire is stowed.

In recent years, the biggest issue in the automotive industry is to preoccupy the electric vehicle market, and one of the most important factors that determine competitiveness of electric vehicles is the range of electric vehicles. Large-capacity batteries are required to increase the range of electric vehicles. Due to an increase in sizes of the batteries, the size of the spare tire well has been gradually reduced. A vehicle with a relatively small spare tire well, such as an electric vehicle, is equipped with a tire mobility kit or temporary mobility kit (TMK), instead of a spare tire. TMK is designed to fix a flat tire.

The mounting of a spare tire is not required by law in advanced countries, but the mounting of a spare tire is required by law in emerging countries. To meet regulations in the emerging countries, it is necessary to design a spare tire mounting structure that allows a user to stably mount a spare tire in an electric vehicle, or the like, having a limited size of the spare tire well.

The information described in this Background section of the present disclosure is only for enhancement of understanding of the general background of the inventive concept(s), and may not be taken as an acknowledgement or any form of suggestion that this information forms the prior art that is already known to those skilled in the art.

SUMMARY

The present disclosure has been made to solve the above-mentioned problems occurring in the prior art while advantages achieved by the prior art are maintained intact.

An aspect of the present disclosure provides a spare tire mounting structure which allows a spare tire to be supported by a jack device between a luggage board and a base surface of a rear floor panel.

According to an aspect of the present disclosure, a spare tire mounting structure may include: a well portion in a rear floor panel of a vehicle body; a jack device mounted within the well portion; a plurality of support bars mounted across the well portion; and a mounting bracket coupled to the plurality of support bars, wherein a spare tire may be detachably mounted on the mounting bracket by a clamp, and be supported by the jack device.

The jack device may be detachably mounted within the well portion, and be raised or lowered within the well portion.

The spare tire mounting structure may further include a support bracket mounted at a top edge of the well portion, wherein the support bracket may directly support the spare tire.

The jack device may be mounted to support the support bracket and disposed under the support bracket.

A guide for guiding a movement of the jack device may be disposed on a bottom wall of the well portion, and a rear end of the guide may be located directly under the support bracket.

The jack device may be movable along the guide in a longitudinal direction of the vehicle. When the jack device moves to the rear end of the guide, the jack device may be raised toward the support bracket and a top end of the jack device may be brought to contact with the bottom surface of the support bracket so as to support the support bracket and the spare tire.

The plurality of support bars may be mounted across the well portion through a pair of fixing brackets, and ends of each support bar may be detachably coupled to the fixing brackets, respectively.

A support pad may be attached to a base surface of the rear floor panel, and the support pad may be located at an opposite side of the support bracket.

A luggage board may be disposed over the spare tire.

The apparatus of the present disclosure have other features and advantages which will be apparent from or are set forth in more detail in the accompanying drawings, which are incorporated herein. These drawings and the following Detailed Description together serve to explain certain principles of the present disclosure.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
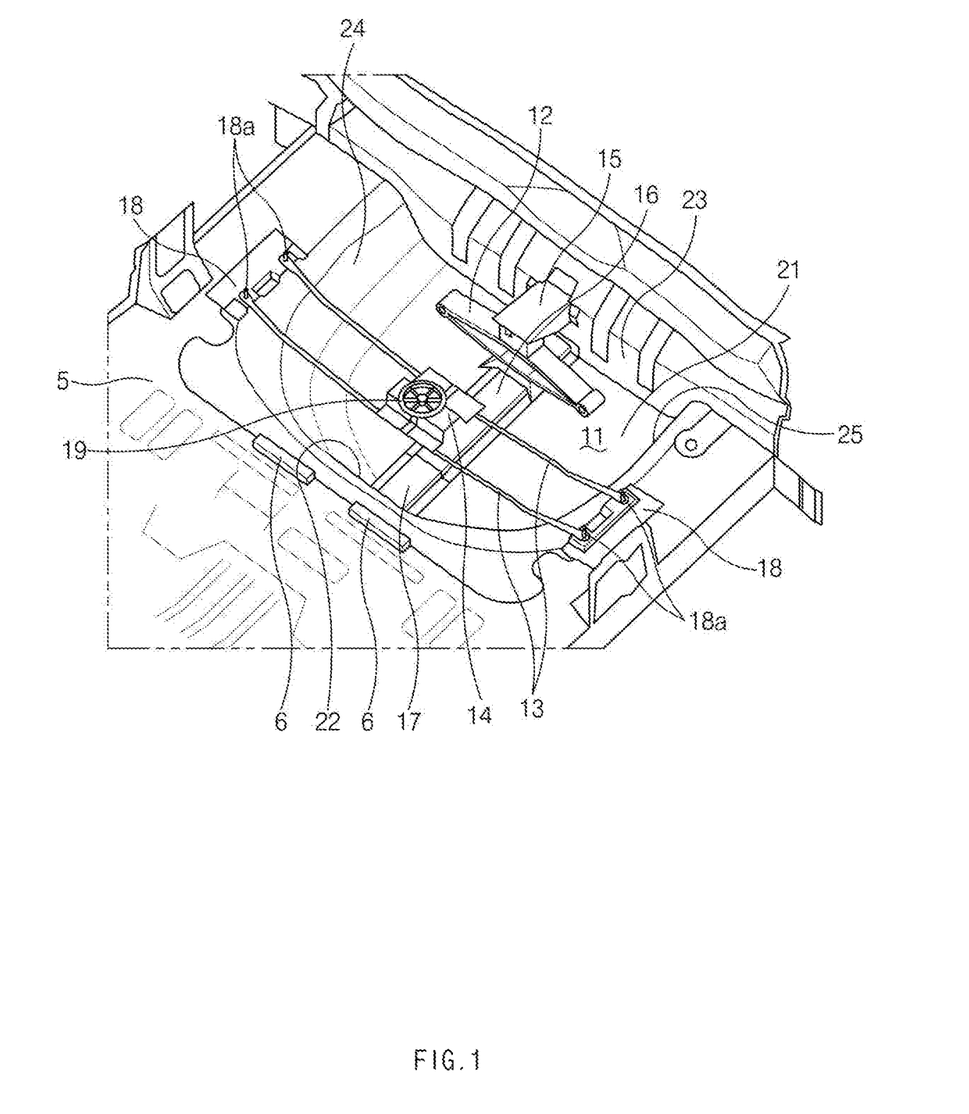
FIG. 1 illustrates a perspective view of a spare tire mounting structure according to an exemplary embodiment of the present disclosure.
Figure 2:
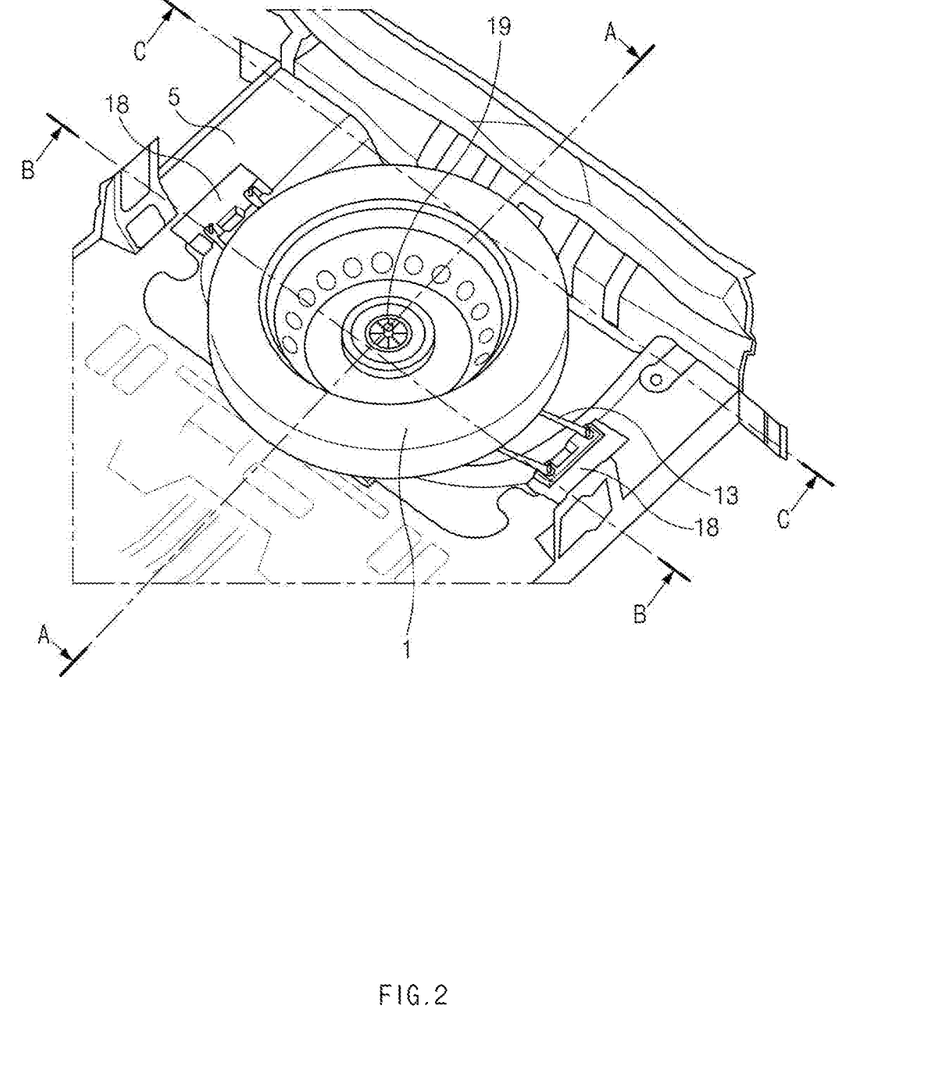
FIG. 2 illustrates a perspective view in which a spare tire is mounted on the spare tire mounting structure of FIG. 1.

Referring to FIG. 1, a spare tire mounting structure 10, according to an exemplary embodiment of the present disclosure, may include a well portion 11 provided in a rear floor panel 5, a jack device 12 detachably mounted within the well portion 11, a plurality of support bars 13 mounted across the well portion 11, and a mounting bracket 14 coupled to the plurality of support bars 13.

Referring to FIGS. 1, 3, 4 and 5, the well portion 11 may be defined by a bottom wall 21, a front wall 22, a rear wall 23, and a pair of side walls 24 and 25. The bottom wall 21 may be recessed downwardly from a base surface of the rear floor panel 5. The front wall 22 may face the front of the vehicle, and the rear wall 23 may face the rear of the vehicle. The pair of side walls 24 and 25 may be left and right side walls facing both sides of the vehicle. The well portion 11 may be recessed downwardly in the rear of the rear floor panel 5.

As described in the Background section, the size of the well portion 11 may be relatively reduced due to an increase in size of a battery in an electric vehicle or the like. Thus, according to one aspect of the present disclosure, the size of the well portion 11 may be smaller than the size of a spare tire 1. For example, relatively small components or accessories, such as jump leads and a warning triangle, may be housed in the well portion 11.

Figure 3:
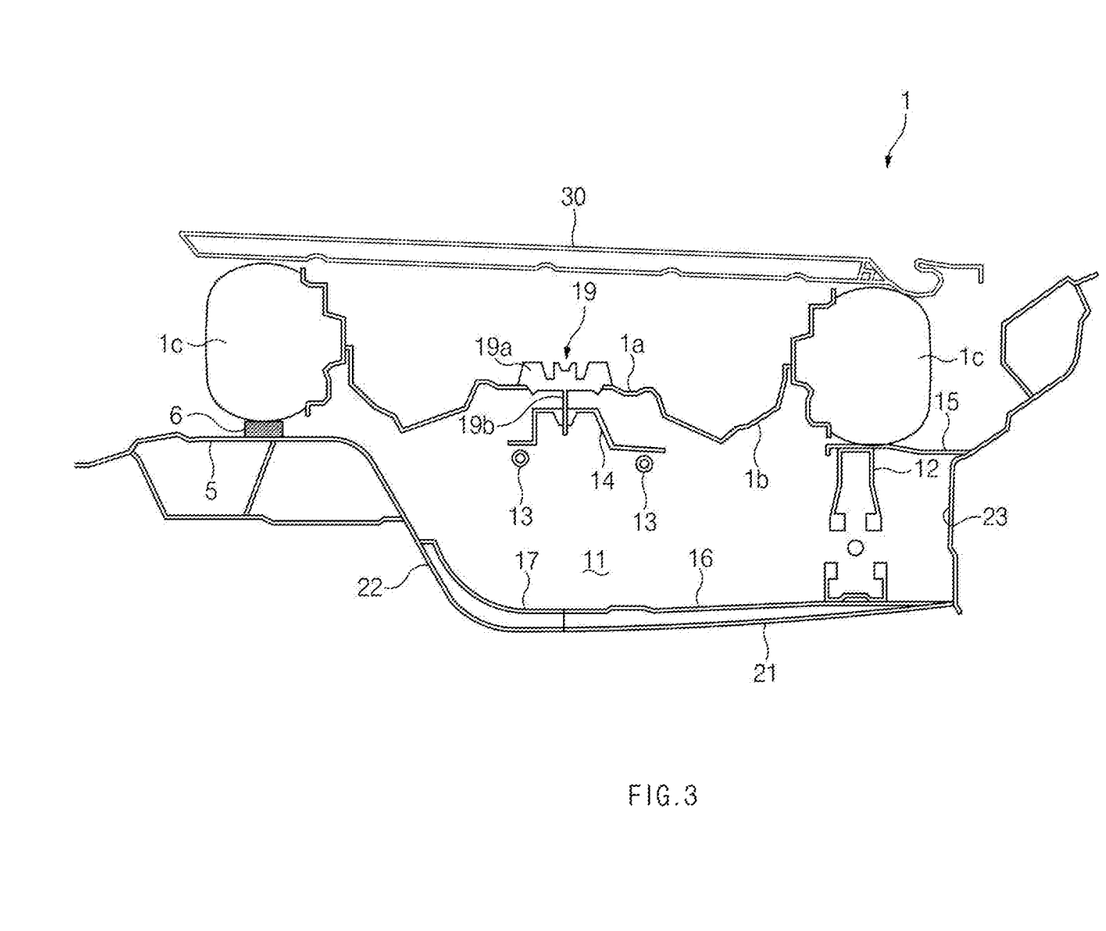
FIG. 3 illustrates a cross-sectional view taken along line A-A of FIG. 2.
Figure 4:
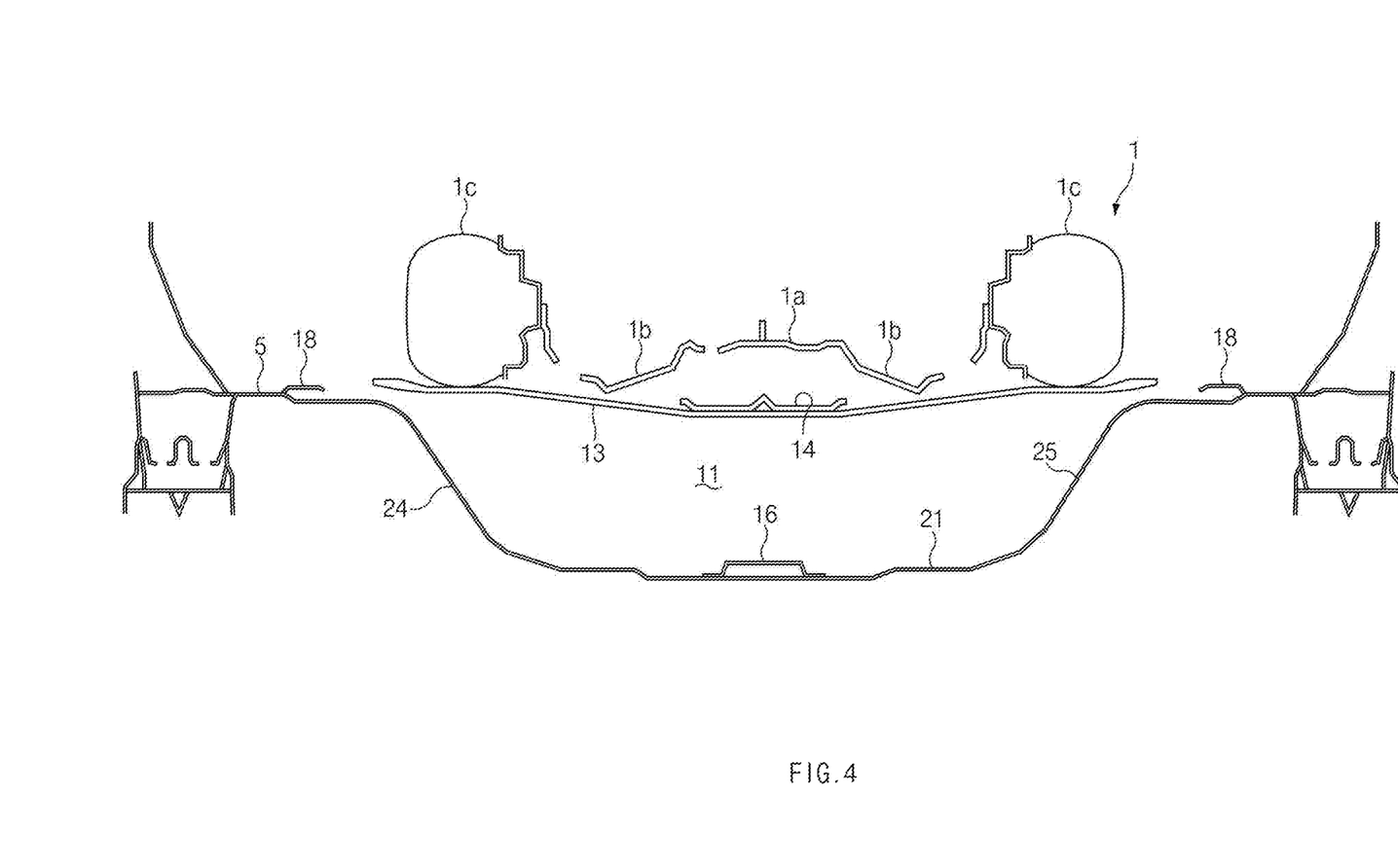
FIG. 4 illustrates a cross-sectional view taken along line B-B of FIG. 2.
Figure 5:
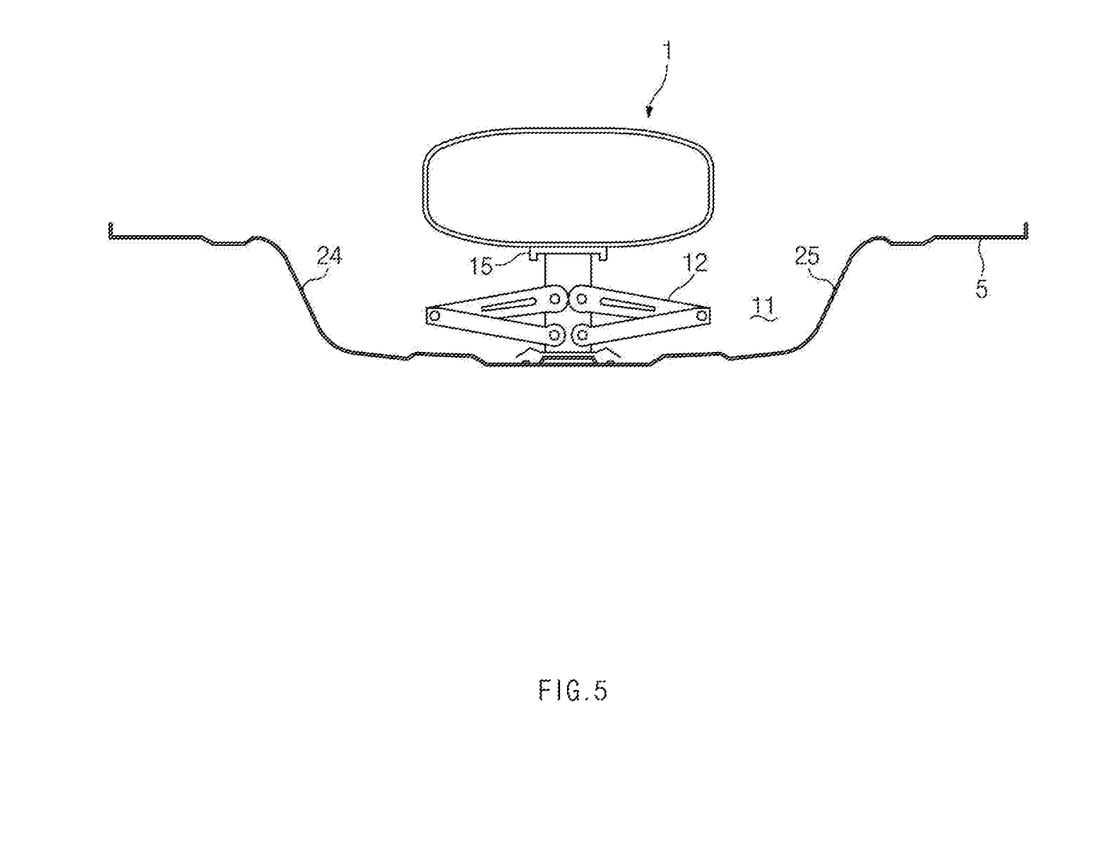
FIG. 5 illustrates a cross-sectional view taken along line C-C of FIG. 2.

Referring to FIGS. 1 and 3, a support bracket 15 may be mounted at a top edge of the well portion 11, and the support bracket 15 may support the spare tire 1. In particular, the support bracket 15 may be mounted at the top edge of the rear wall 23 of the well portion 11, and the support bracket 15 may directly support a bottom surface of the spare tire 1. A guide 16 may be mounted on the bottom wall 21 of the well portion 11, and the guide 16 may extend in a longitudinal direction of the vehicle. A rear end of the guide 16 may be directly connected to the rear wall 23 of the well portion 11, and the rear end of the guide 16 may be located directly under the support bracket 15.

According to an exemplary embodiment of the present disclosure, a reinforcing member 17 may be provided on the bottom wall 21 of the well portion 11. The reinforcing member 17 may be aligned along a center line of the bottom wall 21, and the reinforcing member 17 may extend in the longitudinal direction of the vehicle. The reinforcing member 17 may prevent the rear floor panel 5 from being deformed. In addition, the guide 16 may be directly or indirectly coupled to the reinforcing member 17 by, e.g., welding and/or the like.

The jack device 12 may be detachably mounted in the well portion 11. The jack device 12 may be configured to be raised or lowered, so that the jack device 12 may be used to raise or lower the vehicle for replacement of a flat tire with the spare tire 1. The jack device 12 may be any one of a mechanical jack such as a scissor jack or a house jack, a hydraulic jack, a pneumatic jack, and an electrical jack. In the drawings, the jack device 12 is illustrated as the scissor jack. The jack device 12 may be a component included in owner vehicle maintenance or on-vehicle material (OVM) tools which are mandatory in vehicles provided with spare tires.

The jack device 12 may be configured to move horizontally to the rear end of the guide 16 along the guide 16 in the well portion 11. After the jack device 12 moves to the rear end of the guide 16 in the well portion 11, the jack device 12 may be raised toward the support bracket 15 so that a top end of the jack device 12 may be brought into contact with a bottom surface of the support bracket 15. As the jack device 12 is raised or lowered within the well portion 11, the top end of the jack device 12 may be brought into contact with the bottom surface of the support bracket 15, and accordingly the jack device 12 may support the support bracket 15 and the spare tire 1.

Figure 6:
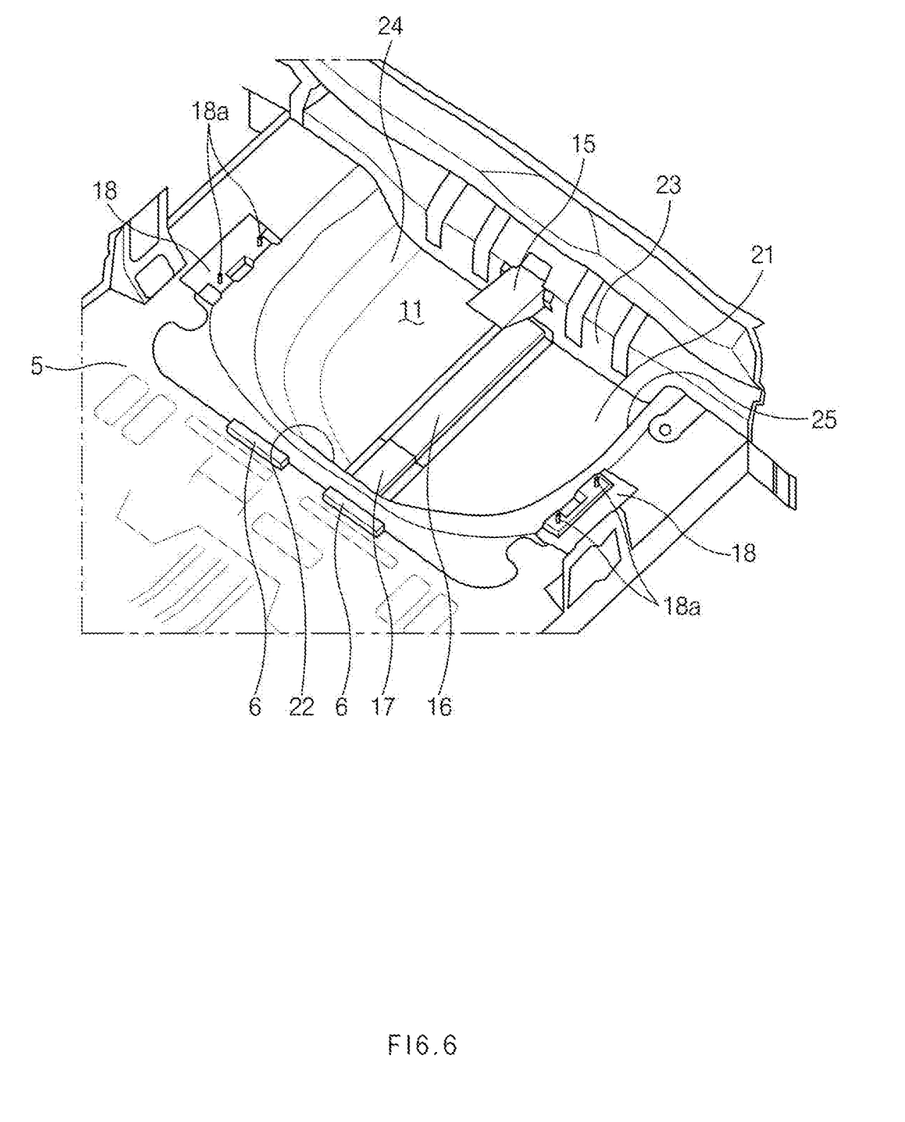
FIG. 6 illustrates a state before the mounting of support bars in a spare tire mounting structure according to an exemplary embodiment of the present disclosure.

Referring to FIGS. 1 to 5, the plurality of support bars 13 may be mounted across the well portion 11 through a pair of fixing brackets 18. The pair of fixing brackets 18 may be coupled to portions of the rear floor panel 5 adjacent to top edges of the side walls 24 and 25 of the well portion 11, respectively. Referring to FIG. 6, each fixing bracket 18 may have two stud bolts 18a, and ends of each support bar 13 may be detachably coupled to the stud bolts 18a of the pair of fixing brackets 18. Thus, two support bars 13 may be mounted across the pair of fixing brackets 18.

The mounting bracket 14 may be mounted in the center of the support bars 13, and the spare tire 1 may be mounted on the mounting bracket 14 through a clamp 19. As the spare tire 1 is mounted on the mounting bracket 14, the bottom surface of the spare tire 1 may be supported by the support bars 13. Referring to FIG. 3, the clamp 19 may have a retainer 19a pressing a central portion 1a of the spare tire 1, and a bolt 19b fastened to the mounting bracket 14. As the bolt 19b is fastened to the mounting bracket 14, the retainer 19a may press the central portion 1a of the spare tire 1, and thus the spare tire 1 may be mounted on the mounting bracket 14 by the clamp 19.

Referring to FIGS. 1 and 3, a support pad 6 may be attached to the base surface of the rear floor panel 5. When the spare tire 1 is mounted on the mounting bracket 14 by the clamp 19, the spare tire 1 may be stably supported by the support pad 6 so that assemblability or ease of mounting of the spare tire 1 may be improved.

In particular, the support pad 6 may be located opposite the support bracket 15. That is, the support pad 6 may be attached to a portion of the rear floor panel 5 adjacent to a top edge of the front wall 22 of the well portion 11, so that the support pad 6 and the support bracket 15 may be spaced apart from each other in the longitudinal direction of the vehicle, and a tire portion 1c of the spare tire 1 may be stably supported by the support pad 6 and the support bracket 15.

Referring to FIG. 3, a luggage board 30 may be disposed over the spare tire 1 so that the spare tire 1 may be located between the luggage board 30 and the base surface of the rear floor panel 5, and thus the capacity of a luggage room may be stably secured.

Hereinafter, a process of mounting the spare tire 1 on the spare tire mounting structure 10 will be described with reference to FIGS. 6 to 10 according to various aspects of the present disclosure.

Referring to FIG. 6, the well portion 11 of the spare tire mounting structure 10 may be empty before the plurality of support bars 13 are coupled to the pair of fixing brackets 18.

Figure 7:
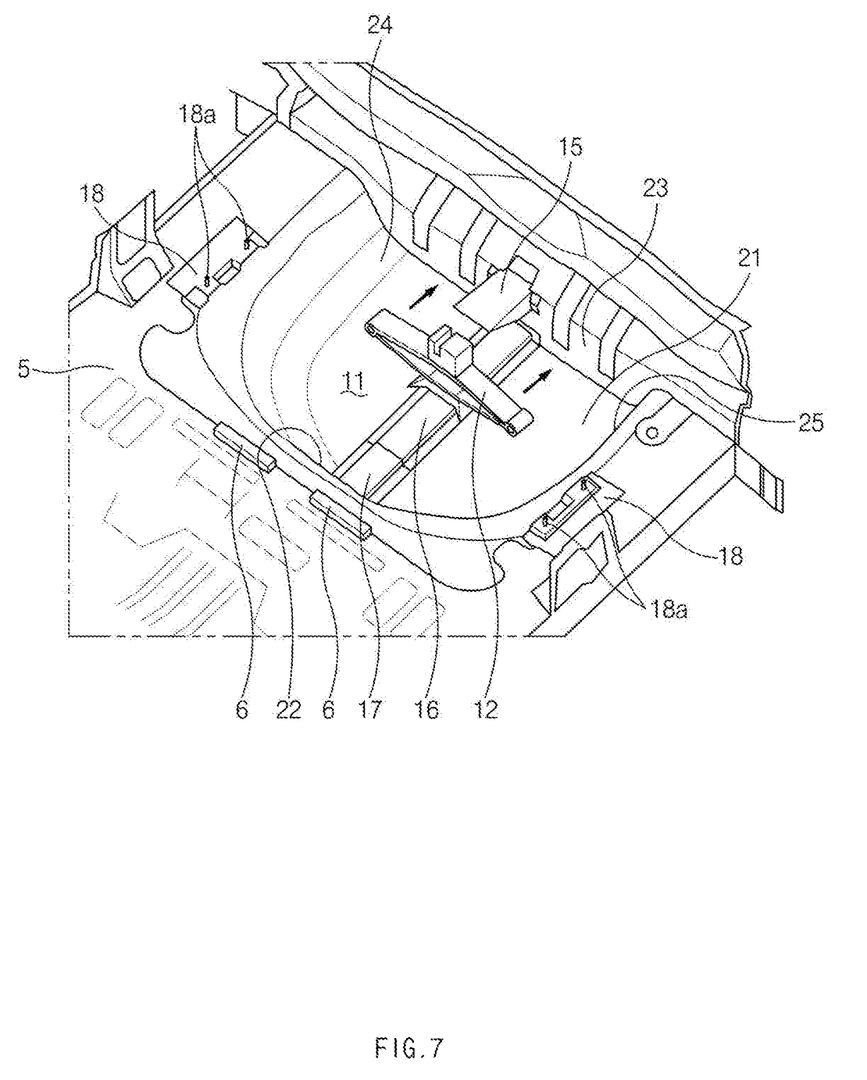
FIG. 7 illustrates a state in which a jack device is moved toward a support bracket along a guide in the state of FIG. 6.
Figure 8:
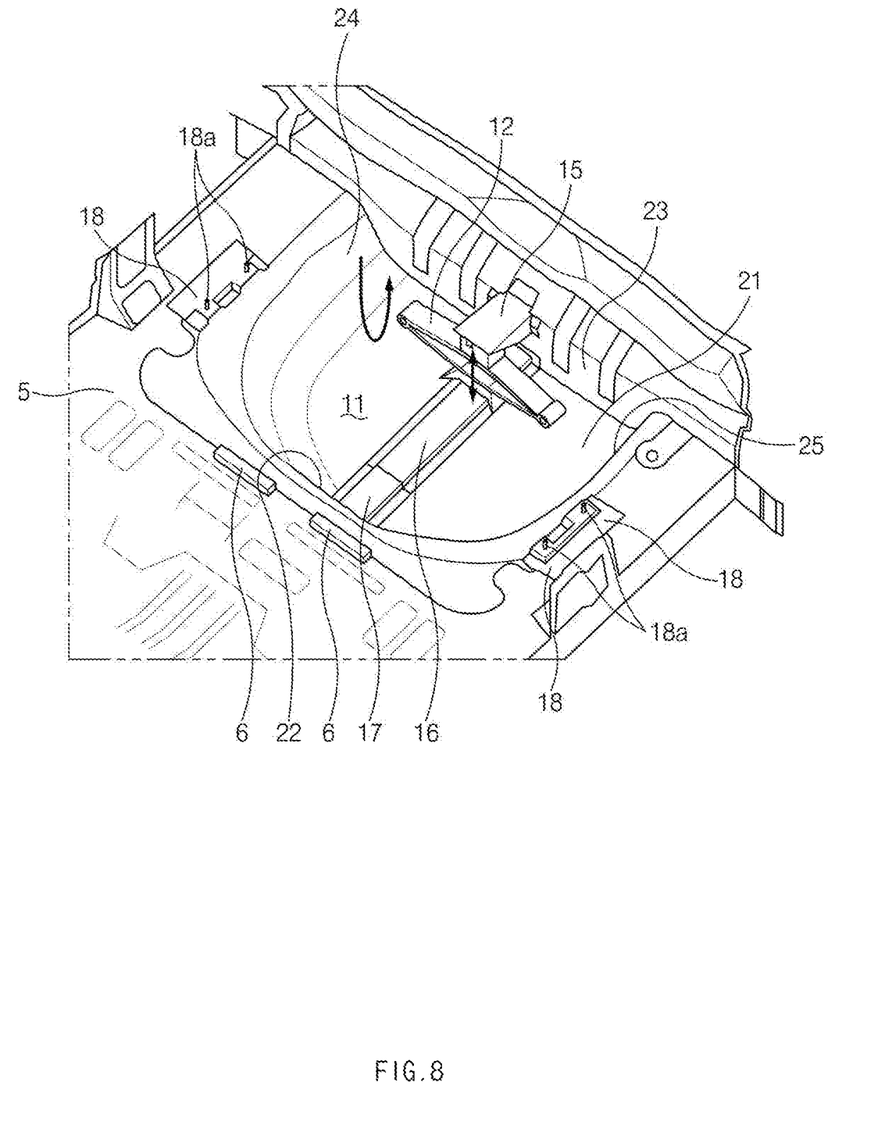
FIG. 8 illustrates a state in which the jack device is raised in the state of FIG. 7.

As illustrated in FIG. 7, the jack device 12 may move to the rear end of the guide 16 along the guide 16. As illustrated in FIG. 8, the jack device 12 may be raised toward the support bracket 15 at the rear end of the guide 16, and the top end of the jack device 12 may be brought into contact with the bottom surface of the support bracket 15 so that the jack device 12 may support the support bracket 15.

Figure 9:
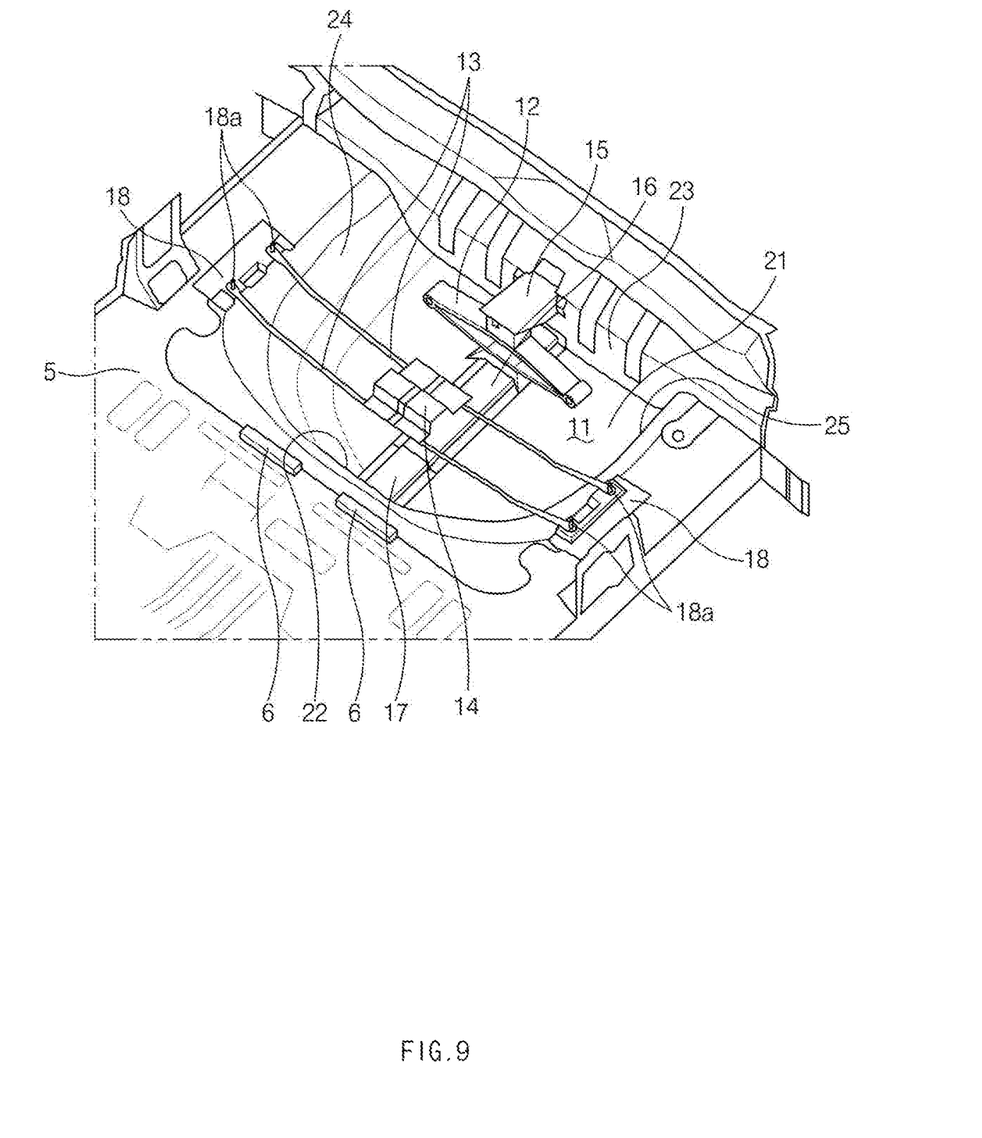
FIG. 9 illustrates a state in which support bars are mounted in the state of FIG. 8.

As illustrated in FIG. 9, the plurality of support bars 13 may be mounted across a top opening of the well portion 11 through the pair of fixing brackets 18. The ends of the support bars 13 may be detachably coupled to the stud bolts 18a of the fixing brackets 18.

Figure 10:
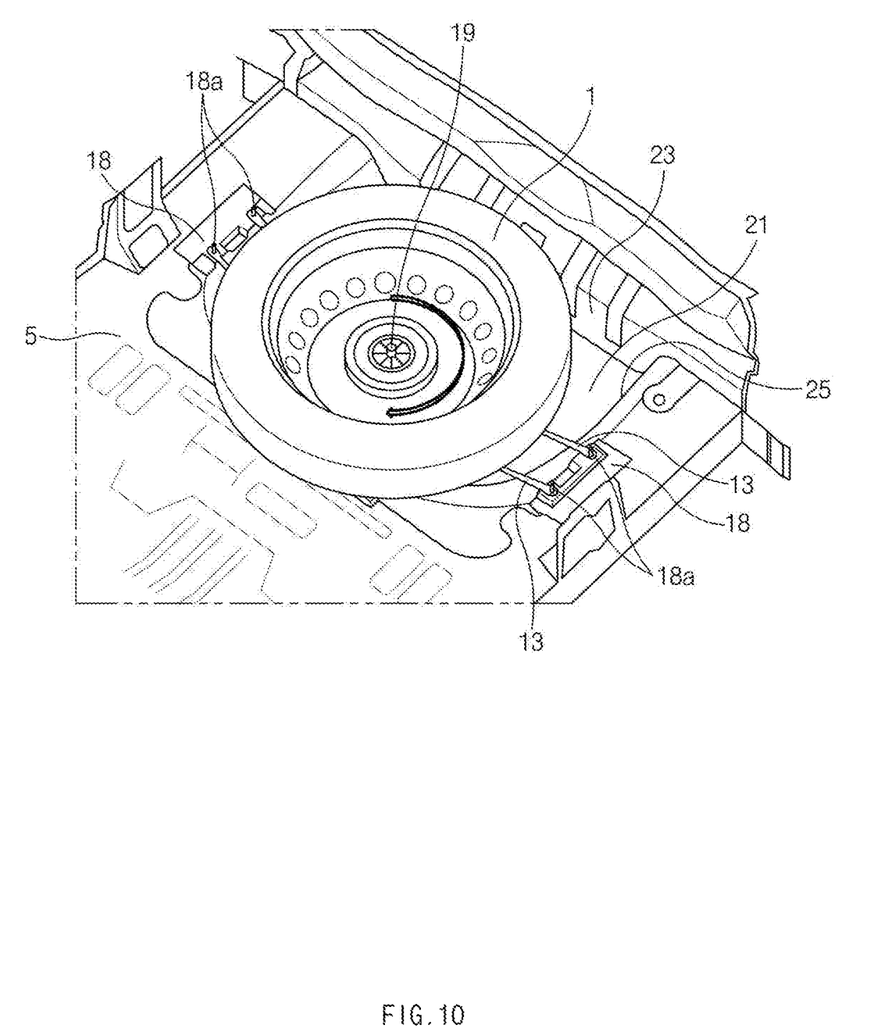
FIG. 10 illustrates a state in which a spare tire is supported by the support bars and is mounted by a clamp in the state of FIG. 9.

As illustrated in FIG. 10, the spare tire 1 may be supported by the center portions of the support bars 13, and the spare tire 1 may be mounted on the mounting bracket 14 by the clamp 19.

As set forth above, the spare tire mounting structure according to exemplary embodiments of the present disclosure may allow the spare tire to be supported by the jack device between the luggage board and the base surface of the rear floor panel, thereby easily securing a mounting space of the spare tire and the capacity of the luggage room. In particular, by employing the structure in which the jack device supports the spare tire, deformation due to durability deterioration may be prevented or minimized, and the manufacturing cost may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A spare tire mounting structure, comprising:
   a well portion in a rear floor panel of a vehicle body;
   a jack device mounted within the well portion;
   a plurality of support bars mounted across the well portion, the plurality of support bars upwardly spaced from a bottom wall of the well portion; and
   a mounting bracket coupled to the plurality of support bars,
   wherein a spare tire is detachably mounted on the mounting bracket by a clamp, and is supported by the jack device.

2. The spare tire mounting structure according to claim 1, wherein the jack device is detachably mounted within the well portion, and is raised or lowered within the well portion.

3. The spare tire mounting structure according to claim 2, further comprising a support bracket mounted at a top edge of the well portion,
   wherein the support bracket directly supports the spare tire.

4. The spare tire mounting structure according to claim 3, wherein the jack device is mounted to support the support bracket and disposed under the support bracket.

5. The spare tire mounting structure according to claim 3, wherein a guide for guiding a movement of the jack device is disposed on the bottom wall of the well portion, and
   a rear end of the guide is located directly under the support bracket.

6. The spare tire mounting structure according to claim 5, wherein the jack device is movable along the guide in a longitudinal direction of the vehicle, and
   when the jack device moves to the rear end of the guide, the jack device is raised toward the support bracket and a top end of the jack device is brought to contact with the bottom surface of the support bracket so as to support the support bracket and the spare tire.

7. The spare tire mounting structure according to claim 3, wherein a support pad is attached to a base surface of the rear floor panel, and
   the support pad is located at an opposite side of the support bracket.

8. The spare tire mounting structure according to claim 1, wherein the plurality of support bars are mounted across the well portion through a pair of fixing brackets, and
   ends of each support bar are detachably coupled to the pair of fixing brackets, respectively.

9. The spare tire mounting structure according to claim 1, wherein a luggage board is disposed over the spare tire.

* * * * *

UNITED STATES PATENT AND TRADEMARK OFFICE
CERTIFICATE OF CORRECTION

PATENT NO. : 11,203,384 B2
APPLICATION NO. : 16/598526
DATED : December 21, 2021
INVENTOR(S) : Eon Pyo Kim, Jang Ho Seo and Jae Sung Jung Page 1 of 1

It is certified that error appears in the above-identified patent and that said Letters Patent is hereby corrected as shown below:

On the Title Page

Column 1, Item (72), should read:
-- (72) Inventors: Eon Pyo KIM, Seoul (KR); Jang Ho SEO, Daejeon (KR); Jae Sung JUNG, Suwon-si (KR) --

Signed and Sealed this
Twenty-third Day of May, 2023

Katherine Kelly Vidal
*Director of the United States Patent and Trademark Office*